May 7, 1963
R. L. BLACK
3,088,339
TRANSMISSION
Filed Nov. 4, 1957
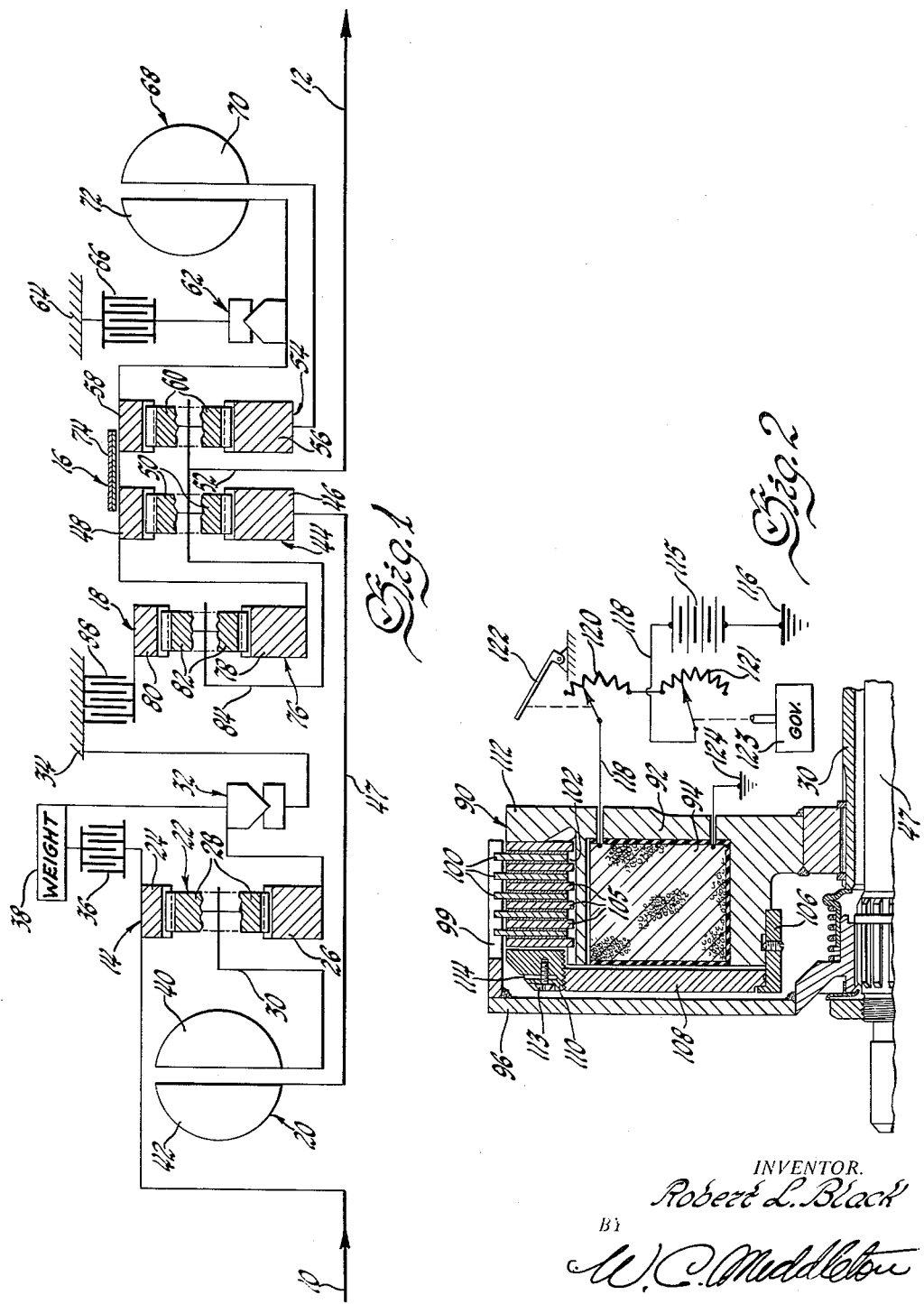
INVENTOR.
Robert L. Black
BY
W. C. Middleton
ATTORNEY — # United States Patent Office 3,088,339
Patented May 7, 1963

3,088,339
TRANSMISSION
Robert L. Black, Allen Park, Mich., assignor to General Motors Corporation, Detroit, Mich., a corporation of Delaware
Filed Nov. 4, 1957, Ser. No. 694,347
22 Claims. (Cl. 74—761)

This invention relates to transmissions and particularly to improvements in plural ratio transmissions of the planetary gear type.

As is well known with a planetary gear unit of the kind comprising driving, driven and reaction elements, a direct drive ratio therethrough can be obtained by clutching together two of the elements and a different drive ratio when the reaction element is braked against rotation. If several gear sets are connected in series, then simply by clutching and braking the proper elements of each gear set to afford different forward drive ratios, shifts or transitions can be made to occur progressively until a direct or overdrive ratio is established through the transmission. Since each shift required appropriate clutching and braking operations to condition the gearing, the shifts can be very rough and, therefore, objectionable to the operator unless provision is made for coordinating the transitions from one ratio to another.

With the foregoing in mind, the invention seeks to provide a plural ratio transmission that is constructed in a novel manner to produce smooth shifts or changes from one ratio to another and that has the operating units thereof compactly arranged so that the transmission requires a minimum of space.

The invention contemplates a transmission of the foregoing character utilizing a gear unit which can be conditioned for direct drive with the inertias of acceleration and deceleration substantially balanced to provide a smooth change in drive ratio through the unit. In particular, the gear unit comprises driving, driven and reaction elements with a reaction mass connected to the reaction element so that when the driving and reaction elements are clutched together to rotate in unison, the accelerated inertia represented by both the reaction element and the reaction mass substantially balances the decelerated inertia of the driving element.

Further, the invention affords a slippable clutch in the drive train which slips when the engine is idling so that the vehicle will not creep.

Specifically, the invention provides a slippable clutch that may be hydraulically or magnetically operated with the degree of slip being controlled in accordance with throttle positions and/or vehicle speed.

Another object of the invention is to provide a plural ratio transmission in which one gear unit thereof utilizes a fluid coupling and a one-way brake to produce a smooth shifting gear unit.

According to the invention, the foregoing fluid coupling and one-way brake controlled gear unit are combined with an inertia balanced gear unit and a slippable clutch to furnish a smooth shifting plural ratio transmission.

Another object of the invention is the provision of two planetary gear units interconnected in a novel manner to afford a compact unit for easily combining with other gear units.

In one form of the invention, a transmission is provided with a series of planetary gear units for transferring drive between an input and an output at a plurality of drive ratios. A front unit including driving, driven and reaction elements is arranged so that the driving element is connected to the input and the reaction element is connected to ground by a one-way brake. The inertias through the unit are balanced by a mass so that when the unit is locked up for direct drive by the clutch, the transition will take place smoothly. A rear unit is interconnected between the output and the front unit and has two gear sets with a driving element connected to the driven element of the front unit gear set. Reaction elements for the rear unit are prevented from rotation by a grounded one-way brake and a driven element, which is common to both gear sets, is connected to the output. By utilizing a fluid coupling to lock up the rear unit for direct drive, the shift therethrough is caused to occur gradually without discernment by the operator. The transmission also includes a reverse gear unit which, when operative, will drive the output in a reverse direction. Interposed between the front and rear units is a slippable clutch which may be hydraulically or magnetically operated so that the clutch does not transmit sufficient torque with the engine idling to drive the vehicle, provision being made for correlating the slip of the clutch with throttle position and/or vehicle speed.

The foregoing and other objects and advantages of the invention will be apparent from the following description and from the accompanying drawings in which:

FIGURE 1 is a schematic illustration of a transmission embodying the principles of the invention, and FIGURE 2 is a sectional view of a magnetically operated clutch adapted for use in the FIGURE 1 transmission.

Referring to FIGURE 1, a transmission is illustrated schematically comprising an input 10 connected to a suitable power source, such as a vehicle engine (not shown), and an output 12 in drive relation with the vehicle wheels (not shown). Interposed between the input 10 and output 12 are a front unit 14, a rear unit 16 and a reverse unit 18. These units, as will be explained, are operated by appropriate ratio changing devices to provide four forward drive ratios and one reverse drive ratio. In the drive train between the front unit 14 and the rear unit 16 is a slippable clutch, e.g., a fluid coupling 20, the function of which will be described later.

The front unit 14 includes a single planetary gear set 22 having a ring gear 24 connected to the input 10, a reaction sun gear 26, and a plurality of planet pinions 28 which are journaled on a carrier 30, intermeshing with the gears 24 and 26. Reverse rotation of the reaction sun gear 26 is prevented by a one-way brake, denoted generally at 32, and grounded at 34. Brake 32 is of the type utilizing a series of one-way elements such as sprags or rollers. With the ring gear 24 driving, the sun gear 26 will attempt to rotate backwards which will be prevented by the one-way brake 32 and, therefore, the carrier 30 will be rotated forwardly in the same sense as the ring gear 24, but at a reduced speed. To lock up the gear set 22 for direct drive, a clutch 36, which may be of the multi-disk type, is furnished between the ring gear 24 and the sun gear 26. When the clutch 36 is engaged, the ring gear 24 and the sun gear 26 will be forced to rotate in unison, with the sun gear 26 being allowed to rotate forwardly by the action of the one-way brake 32 and, as a result, the carrier 30 will be driven at the same speed as the ring gear 24.

Whenever the clutch 36 is engaged to accomplish a shift from underdrive to direct drive through the gear set 22, there can be a very noticeable shock or jar resulting from the torque produced by the deceleration of the engine connected parts. This is due to the fact that the inertia of the engine connected parts, which are decelerated, is greater than that of the clutched or reaction parts, which are accelerated. As a result there is an unbalance of forces to the carrier 30. To smoothen the shift, while permitting a quick engagement of clutch 36, a reaction mass, designated generally at 38, is connected to the sun gear 26 for rotation therewith.

The determination of the weight of the mass 38 can be best explained by the following example. Assuming that the gear set 22 is selected to afford a 1.55 gear ratio and that the carrier is rotating forwardly at 1000 r.p.m., then with the gear set 22 prepared for underdrive, i.e., the sun gear 26 is prevented from reverse rotation by the brake 32, the input 10 and ring gear 24 will be rotating forwardly at 1550 r.p.m. To complete the shift to direct drive, the speed of the stationary sun gear must be accelerated to 1000 r.p.m. while the ring gear 24 and the input 10 are decelerated 550 r.p.m. Using the symbol IE to represent the inertia of the engine connected parts, namely, input 10 and ring gear 24, and the symbol IR to denote the inertia of the reaction parts, such as sun gear 22, for the inertias to be balanced, the equation $IE=IR$ must be satisfied. Substituting in the equation, the acceleration and deceleration r.p.m. values, it becomes $550IE=1000IR$. Once IE has been determined, IR can be ascertained and the reaction mass 38 made of such weight that it and the sun gear 26 rotating therewith provide the necessary inertia. With the inertia of the clutched parts balanced according to the equation, the clutch 36 will engage smoothly without discernment by the vehicle operator.

The fluid coupling 20, which is interposed between the front unit 14 and the rear unit 16, is of a known construction having a pump 40 connected to and driven by the front unit carrier 30 and a turbine 42 driven through the agency of fluid by the pump 40. In the rear unit 16, a second gear set 44 has a sun gear 46 connected through an intermediate shaft 47 to the turbine 42 and a ring gear 48, both of which intermesh with a series of planet pinions 50 journaled on a carrier 52, in turn, connected to the output 12. A third gear set 54 is spaced adjacent to gear set 44 and includes a sun gear 56, a ring gear 58 and a series of planet pinions 60, which are journaled on the same carrier 52, intermeshing with the gears 56 and 58. The sun gears, planet pinions and ring gears of both sets 44 and 54 have identical tooth numbers for a reason to be explained.

Both of the ring gears 48 and 58 are connected and when the unit 16 is in reduced drive, the gears 48 and 58 are prevented from rotating backwardly by a one-way brake 62, similar to the front unit one-way brake 32, grounded at 64 through a neutral brake 66. When a direct drive through the rear unit is desired, the reaction ring gears 48 and 58 are clutched together with the sun gear 56 by a fluid coupling, shown generally at 68. The coupling 68 has an element 70 connected to the sun gear 56 and another element 72 connected to the ring gears 48 and 58. After the fluid coupling 68 is filled with a predetermined quantity of fluid, the reaction ring gears 48 and 58 will commence to rotate forwardly, which is permitted by the one-way brake 62, with the sun gear 56. Because of the identical tooth numbers, the sun gear 56 will rotate forwardly at the same speed as the driving sun gear 46 for the rear unit 16 and the entire unit 16 will be locked up so that the output 12 is driven at substantially the same speed as the intermediate shaft 47, with the only difference in speed being due to the inherent slip within the coupling 68. The function of an overrun brake band 74 that prevents rotation of the reaction ring gears 48 and 58 in either direction will be described in the operational summary.

In the reverse unit 18, a reverse gear set 76 is provided for driving the output shaft 14 backwards. The gear set 76 includes a sun gear 78 connected to the rear unit ring gear 48, a reaction ring gear 80 and a plurality of planet pinions 82 which intermesh with the gears 78 and 80 and which are rotatably mounted on a carrier 84 joined to the rear unit carrier 52. A brake 88 prevents the reaction ring gear 80 from rotation in either direction.

To obtain the first speed ratio, the front unit clutch 36 is disengaged and, therefore, since the front unit sun gear 26 is prevented from rotating backwards by the one-way brake 32, the carrier 30 will rotate forwardly at a reduced speed relative to the input 10. Drive then proceeds through the carrier 30, coupling 20, intermediate shaft 47, and to the sun gear 46 for the gear set 44. The neutral brake 66 will be engaged and the coupling 68 drained of fluid so that reverse rotation of the reaction ring gears 48 and 58 is prevented by the rear unit one-way brake 62. Because the gear sets 44 and 54 have the same tooth numbers, the carrier 52 will rotate forwardly at a reduced speed relative to the intermediate shaft 47. The sun gear 56 for gear set 54, during reduced drive in the rear unit 16, will rotate forwardly at the same speed as the sun gear 46 and carry with it the coupling element 70, but the coupling 68 will be of no effect since it is void of fluid. When the engine is idling with both of the units 14 and 16 conditioned for reduced drive, the fluid coupling 20 will be driven slower than input and at a speed that the coupling 20 will be unable to transmit sufficient torque to the rear unit 16 for driving the vehicle. By depositing the coupling 20 so that it is underdriven, the likelihood of creep of the vehicle with the engine idling is considerably less.

In the second speed ratio, the front unit clutch 36 is engaged and the rear unit 16 continues in reduced drive so that the input 10 and the intermediate shaft 47 will be driven at substantially the same speed, for the gear set 22 will have been locked up by the clutch 36. The speed of the output 12 is then determined entirely by the ratio of the rear unit 16.

To shift from second speed to third speed ratio, the front unit clutch 36 is disengaged and the fluid coupling 68 is filled. Consequently, the front unit 14 will transfer drive from the input 10 to the intermediate shaft 47 at a reduced speed and the output 12, because the rear unit 16 is locked up by the fluid coupling 68 for direct drive, will be driven at substantially the speed of the intermediate shaft 47.

In fourth speed ratio, the front unit clutch 36 is reengaged and both units 14 and 16 will be conditioned for direct drive so that the input 10 will drive the output 12 at nearly the same speed, the only difference being due to the slip in the couplings 20 and 68.

Preferably, the overrun brake band 74 is only engaged in second speed ratio, since with the output 12 driving as during coast of the vehicle, the reaction ring gears 48 and 58 are permitted by the rear unit one-way brake 62 to rotate forward. Otherwise, the rear unit 16 would be ineffective to transfer drive to the locked up front unit 14. By holding the gears 48 and 58 from forward rotation with the band 74, the rear unit 16 attempts to overdrive the engine connected input 10 and the engine will resist this, affording braking when desired, e.g., when descending a steep hill.

In reverse, the front unit clutch 36 is disengaged, the reverse brake 88 engaged, and the neutral brake 66 disengaged. Drive then is transferred from the input 10 through the front unit 14 to the intermediate shaft 47 at a reduced speed and the sun gear 46 for the gear set 44 will be driven forwardly at this reduced speed. The reaction ring gears 48 and 58, as a result, will be driven backwards and carry therewith the reverse unit sun gear 78. With the reverse ring gear 80 held against rotation in either direction, the reverse carrier 84 will be driven backwards at a reduced speed, and since the carrier is connected to the rear unit carrier 52, the output 12 will rotate backwards at a speed determined by the reverse gear set 76 and the front unit gear set 22.

To obtain neutral, the front unit clutch 36, reverse brake 88, overrun brake 74, and neutral brake 66 are all disengaged and the fluid coupling 68 drained of fluid. Drive will be transferred from the front unit in neutral because the front unit one-way brake will engage and afford reaction for the gear set 22. However, since the neutral brake 66 is disengaged the one-way brake 62 for the rear unit 16 will not restrain the reaction ring gears 48 and 58 from rotation and, therefore, the rear unit is incapable of transmitting any torque to the output 12.

In FIGURE 2, a magnetically operated clutch 90 is illustrated which may be substituted for the fluid coupling 20. The clutch 90 includes a housing 92 attached to the front unit carrier 30 in which housing an energizing winding 94 is disposed. An L-shaped member 96 partially encloses the housing 92 and is connected to the intermediate shaft 47. The L-shaped member 96 has a series of longitudinally rearwardly extending grooves 99 adapted to intermesh with external teeth on a series of driven clutch plates 100, while the housing 92 has a series of teeth 102 engageable wtih the mating teeth on a series of driving clutch plates 105. As shown, in between each driven plate 100, one of the driving plates 105 is positioned so that when the plates are compressed a frictional drive results therebetween. At the lower part of the housing 92 a stepped ring 106 is attached, which ring slidably supports an armature 108 to the upper end of which an adjusting ring 110 is threadedly engaged. When the winding 94 is energized, the armature 108 is drawn to the right and the adjusting ring 110 will compress the clutch plates 100 and 105 against a backing portion 112 of the housing 92 so that the intermediate shaft 47 is driven by the front unit carrier 30.

By threadedly engaging the adjusting ring 110 with the armature 108, the distance which the armature 108 must move to engage the clutch plates can be changed as the plates wear. To prevent the adjusting ring 110 from altering position relative to the armature 108, a screw 113 is employed which when tightened will close the annular gap 114 in the ring causing the threads on the adjusting ring 110 to be pinched into tighter engagement with the threads on the armature 108.

The electrical controls for the winding 94 of the magnetically operated clutch 90 have for a source of current a battery 115 grounded at 116 which may be a conventional vehicle battery. A conductor 118 extends from the battery to the winding 94 and has interposed therein a pair of variable resistors, such as rheostats 120 and 121. The rheostat 120 is operated by an accelerator pedal 122 for the vehicle engine throttle (not shown) so that the quantity of current supplied to the winding 94 can be varied with throttle position while the rheostat 121 is operated by a governor, shown generally at 123, preferably driven by the output shaft 12, so that the quantity of current supplied to the winding 94 is also varied with vehicle speed. The circuit from the battery 115 is completed by grounding the winding 94 at 124. The magnetically operated clutch 90 operates somewhat in the manner of the fluid coupling 20 at idle speeds since the accelerator pedal 122 will be released and governor speed will be zero. Therefore, the rheostats 120 and 121 are adjusted so that the amount of current supplied to the winding 94 is not enough to cause the armature 108 and adjusting ring 110 to compress the plates 100 and 105 sufficiently to transmit any torque to the intermediate shaft 47. As the accelerator is depressed to open the engine throttle, the rheostat 120 permits more current to be supplied by the battery 115 to the winding 94 whereupon the clutch plates are moved into tighter engagement so as to transmit the torque being transferred from the engine through the gear set 22 to the intermediate shaft 47. In this manner the magnetically operated clutch 90 is capable of transmitting any torque desired by re-adjusting the position of the accelerator pedal 122. Moreover, with commencement of vehicle movement, rheostat 121 allows more current to be supplied to the winding 94 by the battery 115 so that the torque transmitted is, in addition, proportional to vehicle speed.

By properly calibrating the two rheostats 120 and 121, release of the accelerator pedal 122 above a certain vehicle speed will not cause the clutch 30 to disengage since the current passing through rheostat 121 will be adequate to prevent this. In other words, above this selected vehicle speed, the rheostat 120 is ineffective and the current supplied through rheostat 121 is sufficient to maintain the magnetically operated clutch 90 fully engaged. Otherwise, the drive connection to the engine would be interrupted each time the accelerator pedal 122 was released with a resultant loss of engine braking.

From the foregoing it can be seen that the transmission is provided with a front unit 14 which shifts smoothly due to the balancing of the accelerating and decelerating inertias and a rear unit which shifts smoothly due to the combination of the fluid coupling 68 and the one-way brake 62. When the fluid coupling 68 is filled, the rear unit one-way brake 62 slowly disengages so that the shift is not noticeable to the operator.

I claim:

1. In a transmission for a torque producing engine of the type controlled by a throttle, an input connected to the engine, an output, a drive train interposed between the input and output including first and second gear units for affording a plurality of drive ratios therebetween, each gear unit including driving, driven and reaction elements, ratio establishing devices for each gear unit operable both for holding the reaction element to afford one drive ratio through the gear unit and for joining together two elements of the unit to afford a direct drive ratio therethrough, a reaction mass connected to the first gear unit reaction element for rotation therewith, the ratio establishing device for joining together the reaction element and another element of the first gear unit, when operable, causing acceleration of both the reaction element and the reaction mass and deceleration of said another element, the inertia accelerated being balanced by the inertia decelerated, and an electromagnetically operated clutch in the drive train arranged to vary the torque transferred therethrough in accordance with throttle position.

2. In a transmission, a power input, an output, first and second gear units interposed between the input and output for affording a plurality of drive ratios therebetween, each gear unit including driving, driven and reaction elements, the first gear unit including a brake for preventing rotation of the reaction element in one direction and a clutch for joining together the reaction element and the driving element to rotate in unison, a reaction mass connected to the first gear unit reaction element for rotation therewith, the engagement of the clutch causing acceleration of both the reaction element and the reaction mass and deceleration of the driving element, the inertias of the accelerated reaction element and mass being balanced by the inertia of the decelerated driving element, the second gear unit including a brake for preventing rotation of the reaction element and a fluid coupling operative to clutch together two of the elements to provide a direct drive through the unit, and a slippable clutch interposed between the gear units for varying the torque therebetween.

3. In a transmission, a power driven input, an output, a first gear unit including driving, driven and reaction elements, the driving element of the first gear unit being connected to the input, second and third gear units including a driving element common to each of the second and third gear units drive connected to the first gear unit driven element, a driven element common to each of the second and third gear units connected to the output, and interconnected reaction elements, and ratio establishing devices for each gear unit operable both for holding the reaction element to afford one forward drive ratio through the unit and for joining together two elements of the unit to afford a direct forward drive ratio therethrough.

4. In a vehicle transmission for a torque producing engine, a power driven input, an output, a first gear unit including driving, driven and reaction elements, the driving element of the first gear unit being connected to the input, second and third gear units including a driving element common to each of the second and third gear units arranged to be drive connected to the first gear unit driven element, a driven element common to each of the second and third gear units connected to the output, and interconnected reaction elements, ratio establishing devices and each gear unit operable both for holding the reaction element to afford one forward drive ratio through the unit and for joining together two elements of the unit to afford a direct forward drive ratio therethrough, and a slippable clutch for interconnecting the common driving element for the second and third gear units and the first gear unit driven element and arranged so as to be incapable of transmitting sufficient torque for driving the vehicle when the engine is idling.

5. In a vehicle transmission for a torque producing gine, a power driven input, an output, a first gear unit including driving, driven and reaction elements, the driving element of the first gear unit being connected to the input, second and third gear units including a driving element common to each of the second and third gear units arranged to be drive connected to the first gear unit driven element, a driven element common to each of the second and third gear units connected to the output, and interconnected reaction elements, ratio establishing devices for each gear unit operable both for holding the reaction element to afford one forward drive ratio through the unit and for joining together two elements of the unit to afford a direct forward drive ratio therethrough, a slippable clutch interposed between the gear units incapable of transmitting sufficient torque to drive the vehicle when the engine is idling, and a reaction mass connected to the first gear unit reaction element for rotation therewith, the ratio establishing device for joining together the reaction element and the driving element of the first gear unit causing acceleration of both the reaction element and the reaction mass and deceleration of the driving element, the inertias of the accelerated reaction element and mass being balanced by the inertia of the decelerated driving element.

6. In a vehicle transmission for a torque producing engine of the type controlled by a throttle, an input connected to the engine, an output, a first gear unit including driving, driven and reaction elements, the driving element of the first gear unit being connected to the input, second and third gear units including a driving element common to each of the second and third gear units connected to the first gear unit driven element, a driven element common to each of the second and third gear units connected to the output, and interconnected reaction elements, the first gear unit including a brake for preventing rotation of the reaction element in one direction to afford one drive ratio through the unit and a clutch for joining together the reaction element and the driving element to provide a direct drive ratio therethrough, a reaction mass connected to the first gear unit reaction element for rotation therewith, the engagement of the first gear unit clutch causing acceleration of both the reaction element and the reaction mass and deceleration of the driving element, the inertias of the accelerated reaction element and mass being balanced by the inertia of the decelerated driving element, the second and third gear units including a brake for restraining rotation of the interconnected reaction elements in one direction to afford one drive ratio therethrough, a fluid coupling for clutching together the interconnected reaction elements and another element to afford a direct drive therethrough, and a slippable clutch interposed between the first gear unit driven element and the second gear unit driving element arranged to slip so as to be incapable of transmitting sufficient torque to drive the vehicle when the engine is idling, and means for varying the torque transmitting ability of the slippable clutch with throttle position.

7. In a transmission, a power driven input, an output, a first planetary gear unit including a ring gear connected to the input, a reaction sun gear, and a driven planet carrier having journaled thereon a series of planet pinions intermeshing with the ring and sun gears, a second planetary gear unit including a sun gear connected to the first gear unit carrier, a reaction ring gear, and a carrier connected to the output and having a series of planet pinions journaled thereon intermeshing with the second gear unit sun and ring gears, a third planetary gear unit including a reaction ring gear connected to the second gear unit reaction ring gear, a sun gear, and a series of planet pinions journaled on the output connected carrier for the second planetary gear unit and intermeshing with the third gear unit sun and ring gears, brakes for both the first gear unit reaction sun gear and the second and third gear unit reaction ring gears to provide a reduced drive ratio through the respective gear units, and clutches for both the first gear unit and the second and third gear units adapted to furnish a direct drive ratio through the respective gear units.

8. In a transmission, a power driven input, an output, a first planetary gear unit including a ring gear connected to the input, a reaction sun gear, and a driven planet carrier having journaled thereon a series of planet pinions intermeshing with the ring and sun gears, a second planetary gear unit including a sun gear connected to the first gear unit carrier, a reaction ring gear, and a carrier connected to the output and having a series of planet pinions journaled thereon intermeshing with the second gear unit sun and ring gears, a third planetary gear unit including a reaction ring gear connected to the second gear unit reaction ring gear, a sun gear, and a series of planet pinions journaled on the output connected carrier for the second planetary gear unit and intermeshing with the third gear unit sun and rings gears, brakes for both the first gear unit reaction sun gear and the second and third gear unit reaction ring gears to provide a reduced drive ratio through the respective gear units, clutches for both the first gear unit and the second and third gear units adapted to furnish a direct drive ratio through the respective gear units, and a reaction mass connected to the first gear unit reaction sun gear for rotation therewith, the engagement of the first gear unit clutch causing acceleration of both the reaction sun gear and the reaction mass and deceleration of the ring gear, the inertias of the accelerated reaction sun gear and mass being balanced by the inertia of the decelerated ring gear.

9. In a transmission, a power driven input, an output, a first planetary gear unit including a ring gear connected to the input, a reaction sun gear, and a driven planet carrier having journaled thereon a series of planet pinions intermeshing with the ring and sun gears, a second planetary gear unit including a sun gear connected to the first gear unit carrier, a reaction ring gear, and a carrier connected to the output and having a series of planet pinions journaled thereon intermeshing with the second gear unit sun and ring gears, a third planetary gear unit including a reaction ring gear connected to the second gear unit reaction ring gear, a sun gear, and a series of planet pinions journaled on the output connected carrier for the second planetary gear unit and intermeshing with the third gear unit sun and ring gears, a brake for the first gear unit sun gear to provide a reduced drive ratio through the first gear unit, a clutch for joining the sun and ring gears of the first gear unit to afford a direct drive ratio through the first gear unit, a reaction mass connected to the first gear unit reaction sun gear for rotation therewith, the engagement of the first gear unit clutch causing acceleration of both the reaction sun gear and the reaction mass and deceleration of the ring gear, the inertias of the accelerated reaction sun gear and mass being balanced by the inertia of the decelerated ring gear, a one-way brake for holding the second and third unit reaction ring gears from rotation in one direction to provide a reduced drive through the second and third gear units, and a fluid coupling for joining the sun gear of the third gear unit and the reaction ring gears of the second and third gear units to provide a direct drive ratio through the second and third gear units.

10. In a vehicle transmission for a torque producing engine of the type controlled by a throttle, a power driven input, an output, a first planetary gear unit including a ring gear connected to the input, a reaction sun gear, and a driven planet carrier having journaled thereon a series of planet pinions intermeshing with the ring and sun gears, a second planetary gear unit including a sun gear connected to the first gear unit carrier, a reaction ring gear, and a carrier connected to the output and having a series of planet pinions journaled thereon intermeshing with the second gear unit sun and ring gears, a third planetary gear unit including a reaction ring gear connected to the second gear unit reaction ring gear, a sun gear, and a series of planet pinions journaled on the output connected carrier for the second planetary gear unit and intermeshing with the third gear unit sun and ring gears, a brake for the first gear unit sun gear to provide a reduced drive ratio through the first gear unit, a clutch for joining the sun and ring gears of the first gear unit to afford a direct drive ratio through the first gear unit, a reaction mass connected to the first gear unit reaction sun gear for rotation therewith, the engagement of the first gear unit clutch causing acceleration of both the reaction sun gear and the reaction mass and deceleration of the ring gear, the inertias of the accelerated reaction sun gear and mass being balanced by the inertia of the decelerated ring gear, a one-way brake for holding the second and third gear unit reaction ring gears from rotation in one direction to provide a reduced drive through the second and third gear units, a fluid coupling for joining the sun gear of the third gear unit and the reaction ring gears of the second and third gear units to provide a direct drive ratio through the second and third gear units, and a slippable clutch interposed between the first gear unit carrier and the second gear unit sun gear arranged to slip so as to be incapable of transmitting sufficient torque to drive the vehicle when the engine is idling.

11. In a vehicle transmission for a torque producing engine of the type controlled by a throttle, a power driven input, an output, a first planetary gear unit including a ring gear connected to the input, a reaction sun gear, and a driven planet carrier having journaled thereon a series of planet pinions intermeshing with the ring and sun gears, a second planetary gear unit including a sun gear connected to the first gear unit carrier, a reaction ring gear, a carrier connected to the output and having a series of planet pinions journaled thereon intermeshing with the second gear unit sun and ring gears, a third planetary gear unit including a reaction ring gear connected to the second gear unit reaction ring gear, a sun gear, and a series of planet pinions journaled on the output connected carrier for the second planetary gear unit and intermeshing with the third gear unit sun and ring gears, a brake for the first gear unit sun gear to provide a reduced drive ratio through the first gear unit, a clutch for joining the sun and ring gears of the first gear unit to afford a direct drive ratio through the first gear unit, a reaction mass connected to the first gear unit reaction sun gear for rotation therewith, the engagement of the first gear unit clutch causing acceleration of both the reaction sun gear and the reaction mass and deceleration of the ring gear, the inertias of the accelerated reaction sun gear and mass being balanced by the inertia of the decelerated ring gear, a one-way brake for holding the second and third gear unit reaction ring gears from rotation in one direction to provide a reduced drive through the second and third gear units, a fluid coupling for joining the sun gear of the third gear unit and the reaction ring gears of the second and third gear units to provide a direct drive ratio through the second and third gear units, a slippable clutch interposed between the first gear unit carrier and the second gear unit sun gear arranged to slip so as to be incapable of transmitting sufficient torque to drive the vehicle when the engine is idling, and means for varying the torque transmitting ability of the slippable clutch with throttle position.

12. In a vehicle transmission for a torque producing engine of the type controlled by a throttle, a power driven input, an output, a first planetary gear unit including a ring gear connected to the input, a reaction sun gear, and a driven planet carrier having journaled thereon a series of planet pinions intermeshing with the ring and sun gears, a second planetary gear unit including a sun gear connected to the first gear unit carrier, a reaction ring gear, and a carrier connected to the output and having a series of planet pinions journaled thereon intermeshing with the second gear unit sun and ring gears, a third planetary gear unit including a reaction ring gear connected to the second gear unit reaction ring gear, a sun gear, and a series of planet pinions journaled on the output connected carrier for the second planet gear unit and intermeshing with the third gear unit sun and ring gears, a brake for the first gear unit sun gear to provide a reduced drive ratio through the first gear unit, a clutch for joining the sun and ring gears of the first gear unit to afford a direct drive ratio through the first gear unit, a reaction mass connected to the first gear unit reaction sun gear for rotation therewith, the engagement of the first gear unit clutch causing acceleration of both the reaction sun gear and the reaction mass and deceleration of the ring gear, the inertias of the accelerated reaction sun gear and mass being balanced by the inertia of the decelerated ring gear, a one-way brake for holding the second and third gear unit reaction ring gears from rotation in one direction to provide a reduced drive through the second and third gear units, a fluid coupling for joining the sun gear of the third gear unit and the reaction ring gears of the second and third gear units to provide a direct drive ratio through the second and third gear units, and an electromagnetically operated clutch interposed between the first gear unit carrier and the second gear unit sun gear arranged to vary the torque transmitted therethrough in accordance with vehicle speed.

13. In a transmission, a power driven input, an output, a first planetary gear unit including a ring gear connected to the input, a reaction sun gear, and a driven planet carrier having journaled thereon a series of planet pinions intermeshing with the ring and sun gears, a second planetary gear unit including a sun gear connected to the first gear unit carrier, a reaction ring gear, and a carrier connected to the output and having a series of planet pinions journaled thereon intermeshing with the second gear unit sun and ring gears, a third planetary gear unit including a reaction ring gear connected to the second gear unit reaction ring gear, a sun gear, and a series of planet pinions journaled on the output connected carrier for the second planetary gear unit and intermeshing with the third gear unit sun and ring gears, a brake for the first gear unit sun gear to provide a reduced drive ratio through the first gear unit, a clutch for joining the sun and ring gears of the first gear unit to afford a direct drive ratio through the first gear unit, a reaction mass connected to the first gear unit reaction sun gear for rotation therewith, the engagement of the first gear unit clutch causing acceleration of both the reaction sun gear and the reaction mass and deceleration of the ring gear, the inertias of the accelerated reaction sun gear and mass being balanced by the inertia of the decelerated ring gear, a one-way brake for holding the second and third gear unit reaction ring gears from rotation in one direction to provide a reduced drive through the second and third gear units, a fluid coupling for joining the sun gear of the third gear unit and the reaction ring gears of the second and third gear units to provide a direct drive ratio through the second and third gear units, a reverse planetary gear unit interposed between the first and second gear units including a sun gear connected to the second and third gear unit ring gears, a reaction ring gear, a carrier connected to the carrier for the second and third gear units, and a series of planet pinions journaled on the reverse gear unit carrier and intermeshing with the ring and sun gears, and a brake for holding the reverse gear unit ring gear to afford a reverse drive ratio through the transmission.

14. In a transmission for a torque producing vehicle engine of the type controlled by a throttle, an input connected to the engine, an output, a drive train interposed between the input and output including first and second gear units for affording a plurality of drive ratios therebetween, each gear unit including driving, driven and reaction elements, ratio establishing devices for each gear unit operable both for holding the reaction element to afford one drive ratio through the gear unit and for joining together two elements of the unit to afford a direct drive ratio therethrough, a reaction mass connected to the first gear unit reaction element for rotation therewith, the ratio establishing device for joining together the reaction element and another element of the first gear unit, when operable, causing acceleration of both the reaction element and the reaction mass and deceleration of said another element, the inertias of the accelerated reaction element and mass being balanced by the inertia of the decelerated said another element, and an electromagnetically operated clutch in the drive train arranged to vary the torque transferred therethrough in accordance with throttle position and vehicle speed.

15. In a vehicle transmission for a torque producing engine of the type controlled by a throttle, an input connected to the engine, an output, a first gear unit including driving, driven and reaction elements, the driving element of the first gear unit being connected to the input, second and third gear units including a driving element common to each of the second and third gear units connected to the first gear unit driven element, a driven element common to each of the second and third gear units connected to the output, and interconnected reaction elements, the first gear unit including a brake for preventing rotation of the reaction element in one direction to afford one drive ratio through the unit and a clutch for joining together the reaction element and the driving element to provide a direct drive ratio therethrough, a reaction mass connected to the first gear unit reaction element for rotation therewith, the engagement of the first gear unit clutch causing acceleration of both the reation element and the reaction mass and deceleration of the driving element, the inertias of the accelerated reaction element and mass being balanced by the inertia of the decelerated driving element, the second and third gear units including a brake for restraining rotation of the interconnected reaction elements in one direction to afford one drive ratio therethrough, a fluid coupling for clutching together the interconnected reaction elements and another element to afford a direct drive therethrough, and a slippable clutch interposed between the first gear unit driven element and the second gear unit driving element aranged to slip so as to be incapable of transmitting sufficient torque to drive the vehicle when the engine is idling, and means for varying the torque transmitting ability of the slippable clutch with vehicle speed.

16. In a vehicle transmission for a torque producing engine of the type controlled by a throttle, an input connected to the engine, an output, a first gear unit including driving, driven and reaction elements, the driving element of the first gear unit being connected to the input, second and third gear units including a driving element common to each of the second and third gear units connected to the first gear unit driven element, a driven element common to each of the second and third gear units connected to the output, and interconnected reaction elements, the first gear unit including a brake for preventing rotation of the reaction element in one direction to afford one drive ratio through the unit and a clutch for joining together the reaction element and the driving element to provide a direct drive ratio therethrough, a reaction mass connected to the first gear unit reaction element for rotation therewith, the engagement of the first gear unit clutch causing acceleration of both the reaction element and the reaction mass and deceleration of the driving element, the inertias of the accelerated reaction element and mass being balanced by the inertia of the decelerated driving element, the second and third gear units including a brake for restraining rotation of the interconnected reaction elements in one direction to afford one drive ratio therethrough, a fluid coupling for clutching together the interconnected reaction elements and another element to afford a direct drive therethrough, and a slippable clutch interposed between the first gear unit driven element and the second gear unit driving element arranged to slip so as to be incapable of transmitting sufficient torque to drive the vehicle when the engine is idling, and means for varying the torque transmitting ability of the slippable clutch with throttle position and vehicle speed.

17. In a vehicle transmission for a torque producing engine of the type controlled by a throttle, a power driven input, an output, a first planetary gear unit including a ring gear connected to the input, a reaction sun gear, and a driven planet carrier having journaled thereon a series of planet pinions intermeshing with the ring and sun gears, a second planetary gear unit including a sun gear connected to the first gear unit carrier, a reaction ring gear, and a carrier connected to the output and having a series of planet pinions journaled thereon intermeshing with the second gear unit sun and ring gears, a third planetary gear unit including a reaction ring gear connected to the second gear unit reaction ring gear, a sun gear, and a series of planet pinions journaled on the output connected carrier for the second planetary gear unit and intermeshing with the third gear unit sun and ring gears, a brake for the first gear unit sun gear to provide a reduced drive ratio through the first gear unit, a clutch for joining the sun and ring gears of the first gear unit to afford a direct drive ratio through the first gear unit, a reaction mass connected to the first gear unit reaction sun gear for rotation therewith, the engagement of the first gear unit clutch causing acceleration of both the reaction sun gear and the reaction mass and deceleration of the ring gear, the inertias of the accelerated reaction sun gear and mass being balanced by the inertia of the decelerated ring gear, a one-way brake for holding the second and third gear unit reaction ring gears from rotation in one direction to provide a reduced drive through the second and third gear units, a fluid coupling for joining the sun gear of the third gear unit and the reaction ring gears of the second and third gear units to provide a direct drive ratio through the second and third gear units, and an electro-magnetically operated clutch interposed between the first gear unit carrier and the second gear unit sun gear arranged to vary the torque transmitted therethrough in accordance with throttle position and vehicle speed.

18. In a transmission, a power input, an output, first and second gear units interposed between the input and output for affording a plurality of drive ratios therebetween, each gear unit including driving, driven and reaction elements, the first gear unit including a brake for preventing rotation of the reaction element in one direction and a clutch for joining together the reaction element and the driving element to rotate in unison, a reaction mass connected to the first gear unit reaction element for rotation therewith, the engagement of the clutch causing acceleration of both the reaction element and the reaction mass and deceleration of the driving element, the inertias of the accelerated reaction element and mass being balanced by the inertia of the decelerated driving element, the second gear unit including a brake for preventing rotation of the reaction element and a fluid coupling operative to clutch together two of the elements to provide a direct drive through the unit, and a hydrodynamic torque transmitting device interposed between the gear units for varying the torque therebetween.

19. In a vehicle transmission for a torque producing engine, a power driven input, an output, a first gear unit including driving, driven and reaction elements, the driving element of the first gear unit being connected to the input, second and third gear units including a driving element common to each of the second and third gear units arranged to be drive connected to the first gear unit driven element, a driven element common to each of the second and third gear units connected to the output, and interconnected reaction elements, ratio establishing devices for each gear unit operable both for holding the reaction element to afford one forward drive ratio through the unit and for joining together two elements of the unit to afford a direct forward drive ratio therethrough, a fluid coupling interposed between the gear units incapable of transmitting sufficient torque to drive the vehicle when the engine is idling, and a reaction mass connected to the first gear unit reaction element for rotation therewith, the ratio establishing device for joining together the reaction element and the driving element of the first gear unit causing acceleration of both the reaction element and the reaction mass and deceleration of the driving element, the inertias of the accelerated reaction element and mass being balanced by the inertia of the decelerated driving element.

20. In a vehicle transmission for a torque producing engine of the type controlled by a throttle, a power driven input, an output, a first planetary gear unit including a ring gear connected to the input, a reaction sun gear, and a driven planet carrier having journaled thereon a series of planet pinions intermeshing with the ring and sun gears, a second planetary gear unit including a sun gear connected to the first gear unit carrier, a reaction ring gear, and a carrier connected to the output and having a series of planet pinions journaled thereon intermeshing with the second gear unit sun and ring gears, a third planetary gear unit including a reaction ring gear connected to the second gear unit reaction ring gear, a sun gear, and a series of planet pinions journaled on the output connected carrier for the second planetary gear unit and intermeshing with the third gear unit sun and ring gears, a brake for the first gear unit sun gear to provide a reduced drive ratio through the first gear unit, a clutch for joining the sun and ring gears of the first gear unit to afford a direct drive ratio through the first gear unit, a reaction mass connected to the first gear unit reaction sun gear for rotation therewith, the engagement of the first gear unit clutch causing acceleration of both the reaction sun gear and the reaction mass and deceleration of the ring gear, the inertias of the accelerated reaction sun gear and mass being balanced by the inertia of the decelerated ring gear, a one-way brake for holding the second and third gear unit reaction ring gears from rotation in one direction to provide a reduced drive through the second and third gear units, a fluid coupling for joining the sun gear of the third unit and the reaction ring gears of the second and third gear units to provide a direct drive ratio through the second and third gear units, and a fluid coupling interposed between the first gear unit carrier and the second gear unit sun gear arranged to slip so as to be incapable of transmitting sufficient torque to drive the vehicle when the engine is idling.

21. In a transmission for a torque producing engine of the type controlled by a throttle, an input connected to the engine, an output, a drive train interposed between the input and output including a series of gear units interconnecting the input and output to thereby afford a variable ratio drive therebetween, a clutch disposed in the drive train, an electromagnetic actuator for operating the clutch, a source of electric current for operating the actuator, a variable resistor for controlling the quantity of current supplied by the source, a connection between the variable resistor and the throttle for increasing the torque transmitting ability of the clutch with increases in throttle opening, and means for effecting operation of the variable resistor above a predetermined vehicle speed so as to maintain the clutch engaged.

22. In a transmission for a torque producing vehicle engine of the type controlled by a throttle, an input connected to the engine, an output, a drive train interposed between the input and output including a series of gear units interconnecting the input and output to thereby afford a variable ratio drive therebetween, a clutch disposed in the drive train, an electromagnetic actuator for operating the clutch, a source of electric current for operating the actuator, variable resistors for controlling the quantity of current supplied by the source, and a governor driven by the output for controlling one resistor, the other resistor being controlled by the throttle so that the torque transmitting ability of the clutch is increased with increases in throttle opening, said one resistor being arranged to cause the torque transmitting ability of the clutch to be increased with increased speed and coacting with said other resistor so that said other resistor becomes ineffective above a predetermined speed.

References Cited in the file of this patent

UNITED STATES PATENTS

| | | |
|---|---|---|
| 2,241,680 | Taylor | May 13, 1941 |
| 2,302,714 | Pollard | Nov. 24, 1942 |
| 2,578,308 | Lavelli | Dec. 11, 1951 |
| 2,645,135 | Frank | July 14, 1953 |
| 2,709,928 | Jones | June 7, 1955 |
| 2,718,157 | Schaub | Sept. 20, 1955 |